Sept. 13, 1949.　　　　J. B. CLOUGH　　　　2,481,978
AUTOMOBILE RADIO COUPLER AND METHOD OF COMMUNICATION
Filed Jan. 22, 1947　　　　　　　　　　　2 Sheets-Sheet 1
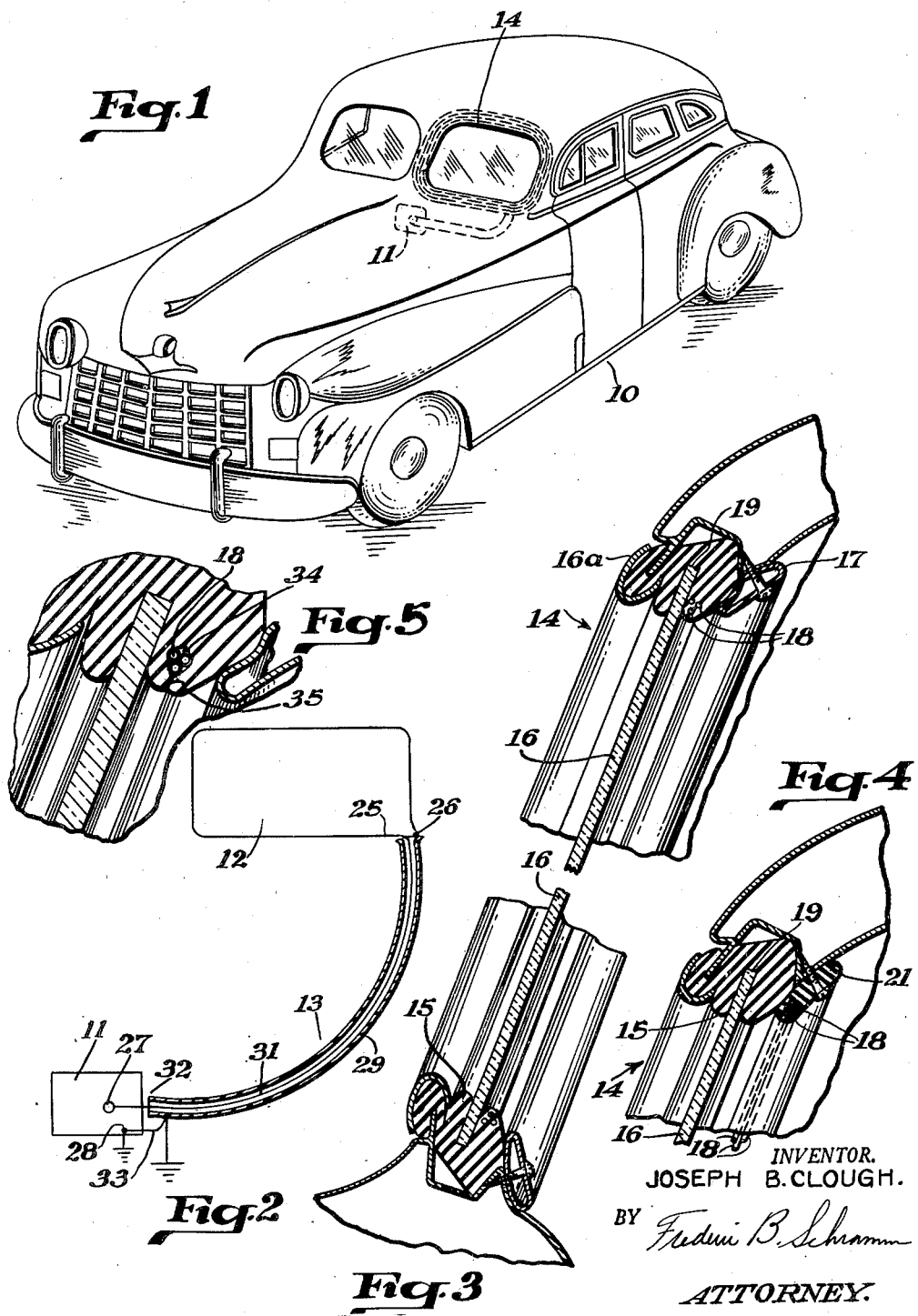
INVENTOR.
JOSEPH B. CLOUGH.
BY
ATTORNEY.

Patented Sept. 13, 1949

2,481,978

UNITED STATES PATENT OFFICE 2,481,978

AUTOMOBILE RADIO COUPLER AND METHOD OF COMMUNICATION

Joseph B. Clough, Cleveland Heights, Ohio

Application January 22, 1947, Serial No. 723,593

5 Claims. (Cl. 250—33)

My invention relates to mobile radio communication and particularly concerns vehicular radio reception.

An object of my invention is to obtain increased efficiency of radio signal transfer to a radio apparatus, such as a receiver or transmitter, with relatively little directional effect.

A further object is to minimize variation of signal intensity with either orientation of the vehicle or location with respect to structure, such as bridges, tunnels and the like, which tend to exercise a shielding effect on mobile radio antennae.

A more specific object of my invention is to provide more efficient and reliable radio reception in metal-bodied automobiles.

Still another object of my invention is to avoid the use of an antenna per se and to employ the metallic body of a vehicle itself as a radio signal receptor or radiator.

Other and further objects, features, and advantages of the invention will become apparent as the description proceeds.

In carrying out the invention in accordance with a preferred embodiment thereof, in connection with the reception of radio signals in an enclosed motor vehicle, I utilize the metallic vehicle body as a radiator or receptor for the flow of radio frequency signal currents. For transferring radio frequency currents corresponding to such signals to a radio receiver, I couple the radio receiver to an appropriate signal current path in the automobile body. Such coupling is preferably accomplished by bringing a coupling coil into inductive relation to the edges of an opening in the automobile body and connecting both ends of the wire forming the coupler coil to the radio frequency terminals of the radio receiver. Preferably, the coupler is mounted at a windshield opening. Although any windshield or window opening at the front, rear or side of the vehicle may be employed, it is advantageous to utilize one of the front windshield openings in order to shorten the connections between the coupler and the radio receiver when the radio receiver is mounted under the dash of the vehicle.

Preferably, the coupler coil is embedded in an insulating material such as a rubber gasket securing a windshield glass in the windshield frame. Alternatively, a plastic windshield molding may be employed. Metal moldings are commonly employed for securing the windshield and gasket in position. When used for supporting the coupler, the molding is composed of an insulating substance such as a molded plastic of the phenolic condensation type for example, and the coupling coil is embedded within such a molding.

A better understanding of the invention will be afforded by the following detailed description considered in conjunction with the accompanying drawing, in which Fig. 1 is a perspective view of a metal body automobile having a radio receiver coupled in accordance with my invention;

Fig. 2 is a schematic diagram of the connections between the coupler and radio receiver;

Fig. 3 is a cross-sectional view of the portion of the metal vehicle body around the windshield together with the windshield glass gasket and the coupling coil mounted in position;

Fig. 4 is a cross-sectional view of a coupling coil embedded in a plastic molding;

Fig. 5 is a fragmentary sectional view corresponding to Fig. 3; and

Like reference characters are utilized throughout the drawing to designate like parts.

Figure 6:
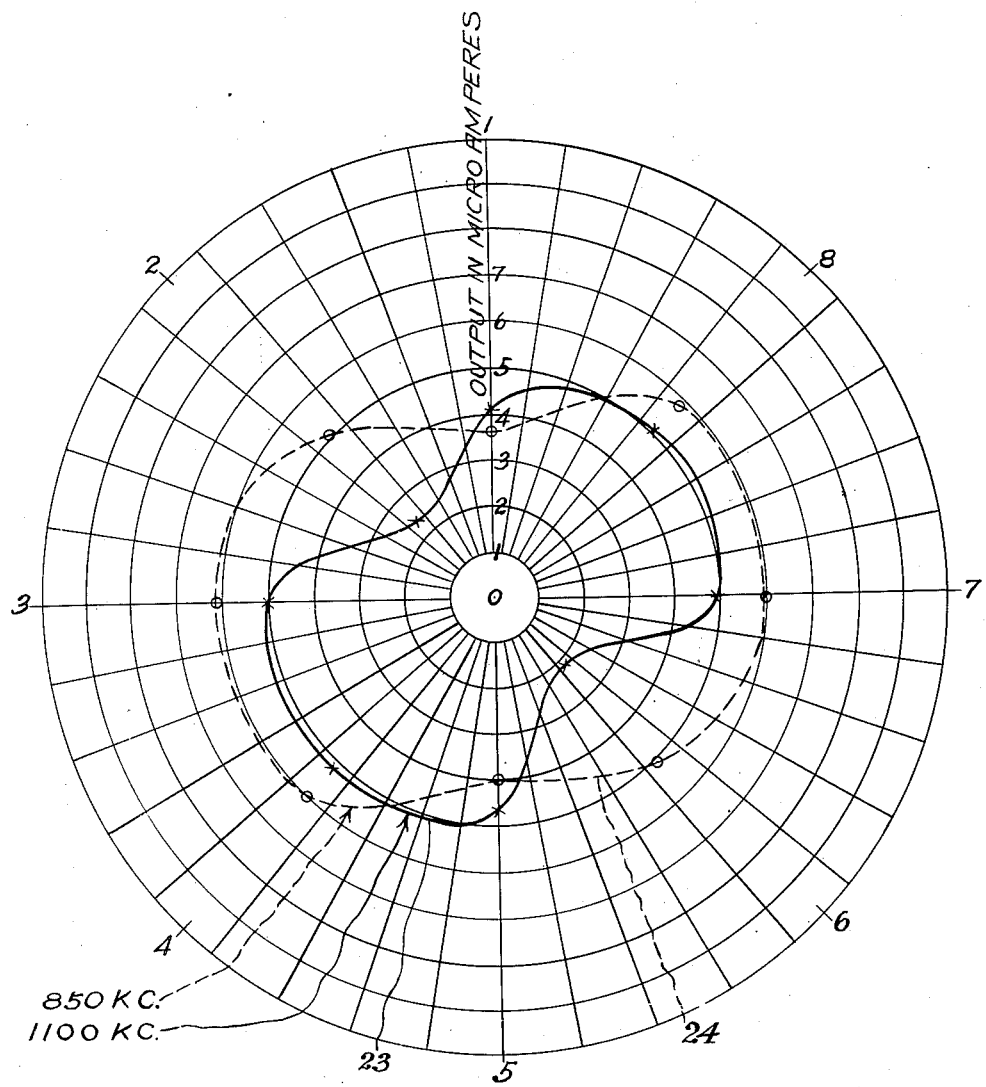
Fig. 6 is a polar diagram explanatory of the operation of the apparatus.

As illustrated in Figs. 1 and 2 of the drawing, in order to receive radio signals in a moving automobile having a metal body 10, a radio receiver 11, indicated schematically, is coupled to the metal of which the automobile body is formed. This is done by bringing a coupling coil 12 into electromagnetic inductive relation to a portion of the metal car body in which circulating currents occur, and connecting the coupling coil 12 to the radio receiver, preferably by means of a shielded cable 13. I have found that circulating currents exist around the edges of an opening in the car body such as the edges of the windshield opening 14, for example. The coupling coil 12 is, therefore, preferably parallel to the edges of the windshield opening 14. Preferably also, the wire constituting the coil 12 is relatively close to the edges of the windshield opening and several turns of wire are employed. The turns of wire should be insulated from the metal car body and from each other. The edge of the windshield opening 14 acts as the primary winding of a transformer, the secondary winding of which is formed by the coupling 12.

A suitable form of coupler is illustrated in Fig. 3. In all-metal automobile bodies, such as illustrated in Fig. 1, it has been customary to provide a gasket 15 of natural or synthetic rubber for mounting a windshield or window glass 16. There may be a steel trim 16a. Such a window glass 16 may be composed of one or more layers of plate glass as will be understood by those skilled in the art. A molding 17 is customarily provided for securing the gasket 15 in position. The molding 17 may be composed of metal or of a synthetic plastic. For the sake of mounting the coupling coil or coupler 12 securely and rigidly and protecting it from abrasion, bending, twisting, or distortion which would change its electrical dimensions, and for the sake also of insulating the wire turns from the metal car body and from each other, the coupling coil 12 is composed of turns of wire 18 embedded in a suitable portion of the gasket 15. For example, the coupler wire turns may lie between the edge 19 of the plate glass 16 and the molding 17, as shown, or around the edge 19 of the glass 16.

For the sake of simplicity in the drawing, only one turn of wire is shown in Fig. 2. My invention does not exclude the use of a single-turn coupling; however, I prefer to employ a plurality of turns, for example, three or four turns of wire insulated from each other.

Where a windshield molding 21 is employed, as illustrated in Fig. 4, it may be composed of an insulating substance such as a synthetic-plastic, like the phenolic condensation product sold under the trade name Bakelite or other suitable plastics. The wire turns 18 of the radio coupler 12 may then be embedded within the plastic molding 21.

For maximum-intensity reliable radio reception, both ends 25 and 26 of the wire 18 in the coupling coil 12 are connected to the radio-frequency terminals 27 and 28 of the radio receiver 11. The shielded cable 13, shown, comprises an outer conductor 29 and a concentric inner conductor 31. When such a co-axial cable is employed, it may be connected at the upper end to the coupling wire end 26 and at the other end 32 to the receiver ground terminal 28 by a connection 33. One or both of the terminals 33 and 28 is preferably also grounded to the vehicle frame and to the radio chassis. The inner conductor 31 is connected at one end to the coupling wire end 25 and at the other end to the radio-frequency receiver terminal 27. If desired, the conductor 31 may constitute a continuation of the wire in the coupling coil 12.

The location of the coupler, as shown, protects the wire turns from flying debris such as stones, sticks and the like, which may be thrown up by the tires of motor vehicles. The arrangement also holds the wire turns rigidly and prevents breakage of wire due to fatigue in case of vibration or whipping to which protruding or extending wires or rods are subjected in moving vehicles. Rigid holding of the wire also insures constancy of electrical dimensions of the radio-frequency circuits. This results because the possibility of change of the electrical dimensions of the coupler itself or of the inductive relationship to the metal, in which the radio currents are induced, is precluded. Furthermore, the arrangement provides complete and continued insulation of the coupling wires.

In the arrangement shown, the radio-signal indicator or receptor 10 consisting of a metal car body is actually insulated from earth by rubber tires. This is true also when my invention is employed with motor buses and trucks and in metal-fuselage aircraft. The invention is not, however, limited to such vehicles and may also be employed in so-called earthed or grounded vehicles such as street railway coaches, locomotive and metal cabin boats and floating structures, and lightships, sheet-metal enclosed crows-nests and the like, or in buildings constructed of metal or having metallic framework. Owing to the nature of radio-frequency waves, especially at the high frequencies, such signal currents occur in such sheet metal structures notwithstanding the fact that they may be connected to earth.

I have found that an automobile coupled to a radio receiver, as illustrated in Fig. 1, may be driven under bridges, and in other locations where radio reception has heretofore become impossible or very faint, with only slightly decreased intensity.

When the orientation of the vehicle is changed, a variation in the received radio-frequency signal intensity takes place, as illustrated in the polar co-ordinate graph shown in Fig. 6. However, the variation is insufficient to cause noticeable change in audio-frequency signal volume. The full-line curve 23 of Fig. 6 illustrates the radio-frequency signal intensity with various orientations of the vehicle when the receiver was tuned to a radio broadcast station operating on one frequency and in one location, and the dashline curve 24 represents the radio frequency signal intensity with various orientations of the vehicle when the radio receiver was tuned to a different broadcast station having a different location and operating on different frequency. Inasmuch as most radio receivers employed are provided with automatic volume control, the variations in radio frequency intensity, indicated in the curves 23 and 24, were found to be insufficient to have perceptible effect on the audio frequency volume. Accordingly, the method of radio communication described, and the form and mounting arrangement of the radio coupler illustrated, result in reliable radio communication substantially free from directional effects.

An advantageous way of embedding the coupling coil 12 in the gasket 15 is to employ an extruded gasket formed, as shown more clearly in Fig. 5, with an extra slit 34 to receive the coil 12. Such gaskets are customarily formed with slits for the glass 16 and the stainless steel trim 16a. The additional slit 34 may, if desired, be cemented shut at 35 after the wires 18 of the coil 12 have been inserted. Preferably, the coil 12 is preformed of wires 18 having thin insulation such as a suitable tough plastic which may be treated to cause the wires 18 to adhere to each other to form a unitary coil, readily insertible within slit 34.

I have herein shown and particularly described certain embodiments of my invention and certain methods of operation embraced therein for the purpose of explaining its principle of operation and showing its application; but, I wish it to be understood that I do not desire to be limited to the exact details of construction shown and described as it will be obvious to those skilled in the art that many modifications and variations are possible.

I claim:

1. A vehicular radio coupler for a metal-body vehicle having a windshield opening therein comprising in combination an insulating plastic windshield-mounting gasket adapted to be mounted at the edges of a windshield, and embedded in said gasket a coil of wire having a pair of ends adapted to be connected to a radio-frequency receiver circuit for inductively coupling said receiver with the metal body of the vehicle.

2. A vehicular radio receiving system comprising in combination with a vehicle having a metallic body with a windshield opening therein, a radio receiver having a pair of radio-frequency input terminals, and a coupler comprising a coil of wire with a pair of ends, each connected to one of said receiver terminals, said coupler being mounted substantially parallel to the windshield in proximity to each of the edges of the windshield opening for inductively coupling the receiver to the metal body of the vehicle.

3. A vehicular radio receiving system comprising in combination with a vehicle having a metallic body with a windshield opening therein, a radio receiver having a pair of radio-frequency input terminals, and a coupler comprising a secondary turn of wire with a pair of ends, each connected to one of said receiver terminals, said coupler being mounted substantially parallel to the windshield in proximity to each of the edges of the windshield opening for inductively coupling the receiver to the metal body of the vehicle.

4. A radio coupler for a metal-body vehicle having a body with an opening therein, comprising in combination therewith a coil of wire, having an enclosed area exceeding half the area of said opening mounted symmetrically in said opening, substantially in the plane thereof, insulated therefrom, and having a pair of ends adapted to be connected to a radio-frequency receiver circuit for inductively coupling the radio receiver circuit to the metal body of the vehicle.

5. An auto radio coupler comprising in combination a rubber gasket adapted to be mounted between the edges of a windshield glass and a windshield opening in a metal frame or vehicle body, and embedded in said gasket a coil of wire having a pair of ends adapted to be connected to a radio-frequency receiver circuit for inductively coupling the radio receiver circuit to the metal body of the vehicle.

JOSEPH B. CLOUGH.

REFERENCES CITED

The following references are of record in the file of this patent:

UNITED STATES PATENTS

| Number | Name | Date |
| --- | --- | --- |
| 1,626,464 | Heina | Apr. 26, 1927 |
| 2,129,852 | Leib | Sept. 13, 1938 |
| 2,151,997 | Springer | Mar. 28, 1939 |
| 2,197,601 | Wolaver | Apr. 16, 1940 |
| 2,329,634 | McDonald | Sept. 14, 1943 |
| 2,353,111 | Davis | July 4, 1944 |

FOREIGN PATENTS

| Number | Country | Date |
| --- | --- | --- |
| 604,353 | Germany | Oct. 4, 1934 |
| 108,096 | Australia | July 25, 1939 |